United States Patent [19]

Kato et al.

[11] Patent Number: 4,676,214

[45] Date of Patent: Jun. 30, 1987

[54] FUEL INJECTION CONTROL APPARATUS FOR USE TO ENGINE

[75] Inventors: Masaaki Kato; Hiroyuki Kano, both of Kariya; Toshihiko Ohmori, Nagoya, all of Japan

[73] Assignee: Nippondenso Co., Ltd., Kariya, Japan

[21] Appl. No.: 707,472

[22] Filed: Mar. 1, 1985

[30] Foreign Application Priority Data

Mar. 5, 1984 [JP] Japan .................................. 59-41703

[51] Int. Cl.$^4$ .......................................... F02M 39/00
[52] U.S. Cl. .................... 123/446; 123/501; 123/447
[58] Field of Search ............... 123/500, 501, 502, 446, 123/447, 357-359; 239/88-95

[56] References Cited

U.S. PATENT DOCUMENTS

| | | | |
|---|---|---|---|
| 4,092,964 | 3/1978 | Hofer et al. | 123/446 |
| 4,385,609 | 5/1983 | Kato | 123/446 |
| 4,396,151 | 8/1983 | Kato | 123/446 |
| 4,425,894 | 7/1984 | Kato et al. | 123/446 |
| 4,485,787 | 12/1984 | Kato | 123/446 |
| 4,502,439 | 3/1985 | Nagase | 123/501 |

FOREIGN PATENT DOCUMENTS

| | | | |
|---|---|---|---|
| 0197467 | 11/1983 | Japan | 123/446 |
| 0222969 | 12/1983 | Japan | 123/446 |
| 0217759 | 12/1983 | Japan | 123/446 |
| 0039962 | 3/1984 | Japan | 123/446 |

Primary Examiner—Carl Stuart Miller

Attorney, Agent, or Firm—Cushman, Darby & Cushman

[57] ABSTRACT

A fuel injection control apparatus for use in an engine wherein fuel injection is controlled in accordance with the conditions of the engines operation. This apparatus is provided with a fuel quantity control unit of the distribution type which measures and discharges an amount of fuel in response to detection signals which represent the conditions of the engines operation, and with a plurality of unit injectors for distributing and supplying fuel to their respective engine cylinders, said fuel being set and measured by the fuel quantity control unit. Each of said unit injectors comprises a compression plunger driven by a cam system which is rotated by a rotation shaft of said engine, a compression pump chamber whose fuel pressure is set by the operation of said compression plunger, an injection plunger driven by the fuel pressure in the compression pump chamber, an injection pump chamber which is filled with fuel whose pressure has been set by the operation of said injection plunger and whose amount has been adjusted by the fuel amount adjuster means, and a timing plunger whose position is set by the amount of fuel adjusted, wherein the fuel pressure in the compression pump chamber caused when the compression plunger is driven causes the timing plunger to move to a specified position and then acts on the injection plunger to raise the pressure in the injection pump chamber, thereby enabling the quantity-adjusted fuel in the injection pump chamber to be injected.

9 Claims, 9 Drawing Figures

FIG. 8
FIG. 9
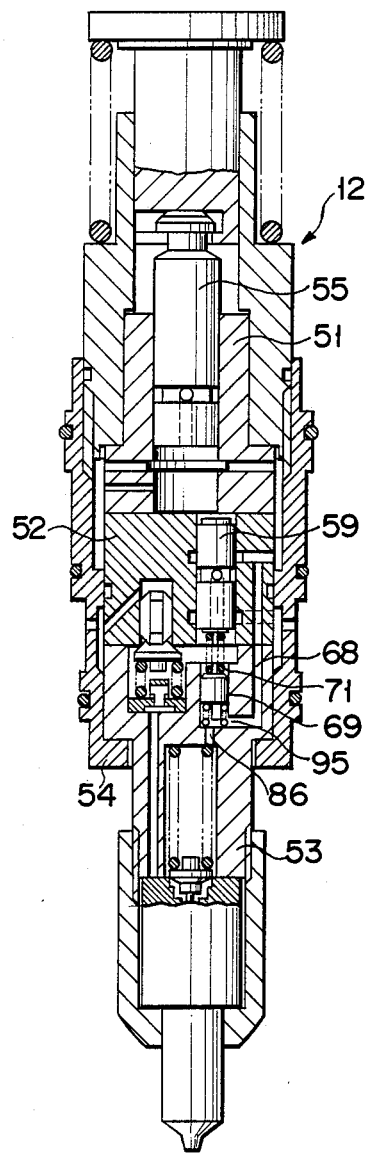
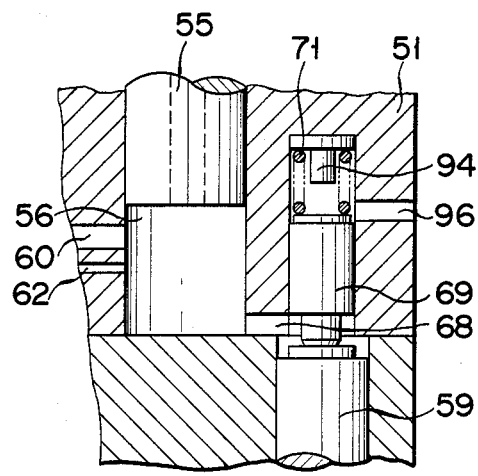

FUEL INJECTION CONTROL APPARATUS FOR USE TO ENGINE

BACKGROUND OF THE INVENTION

The present invention relates to a fuel injection control apparatus for use in an engine and, more particularly, it relates to an improvement of the fuel injection control means which controls fuel to be injected in a controlled amount to each cylinder of the internal combustion engine, namely, a diesel engine.

The fuel injection system is intended to control fuel to be injected to each of its cylinders with every injection and in the case of this fuel injection system, the injection timing is obtained by the mechanical cam system whose rotation is controlled depending upon the engine rotation. In addition, the fuel injection timing is controlled by opening and closing the high pressure fuel passage by means of the electronically-controlled electromagnetic valve.

The fuel injection control means of this type, however, makes it necessary to control the injection timing depending upon the number of engine rotations and load conditions, thereby becoming complicated, large-sized and expensive.

In the engine test carried out under high pressure fuel injection using the unit injector, however, it has been found that the optimum point for engine output, fuel consumption cost, exhausted gas and the like doesn't depend upon the number of engine rotations but the injection timing. More specifically, it is unnecessary, under high pressure fuel injection for the fuel injection timing to be changed corresponding to the number of engine rotations. Therefore in the unit injector, the fuel injection timing is not related to the number of engine rotations but it may only be controlled by load conditions.

SUMMARY OF THE INVENTION

An object of the present invention is to provide a fuel injection control apparatus for use in an engine, which can be effectively applied to a case where fuel injection is achieved by the unit injector which carries out the fuel injection operation supplying high-pressurized fuel, and wherein fuel injection timing is automatically controlled corresponding to load conditions.

Another object of the present invention is to provide a fuel injection control apparatus wherein the amount of fuel injected is set and controlled depending upon load conditions of an engine, the timing of the start of fuel injection by the unit injector is set and controlled by the amount of fuel injected to thereby control the fuel injection timing corresponding to the load conditions of an engine.

A further object of the present invention is to make it unnecessary to achieve specific lead angle control, and to effectively control the fuel injection of an engine, particularly that of a diesel engine.

According to a fuel injection control apparatus of the present invention, an injection plunger is driven and controlled corresponding to the amount of fuel adjusted by a transfer plunger which is synchronously driven with the rotation of an engine. A timing plunger which is driven by the pressure of the amount-adjusted fuel is driven together with the injection plunger in a way that the injection timing increases as the amount of fuel adjusted enlarges.

The amount of fuel injected is adjusted corresponding to the load conditions of an engine, and the fuel which has been adjusted in quantity is supplied to the injector section, where the timing plunger is driven in accordance with the amount of fuel which has been adjusted, and the fuel injection timing is set corresponding to the position of the timing plunger. Therefore, the fuel injection timing can be set and controlled automatically corresponding to the load conditions of an engine only by adjusting the amount of fuel injected in accordance with the load conditions of an engine.

BRIEF DESCRIPTION OF THE DRAWINGS

FIGS. 8 and 9 are sectional views showing the injector section in second and third embodiments of the present invention.

DETAILED DESCRIPTION OF THE PREFERRED EMBODIMENT

Figure 1:
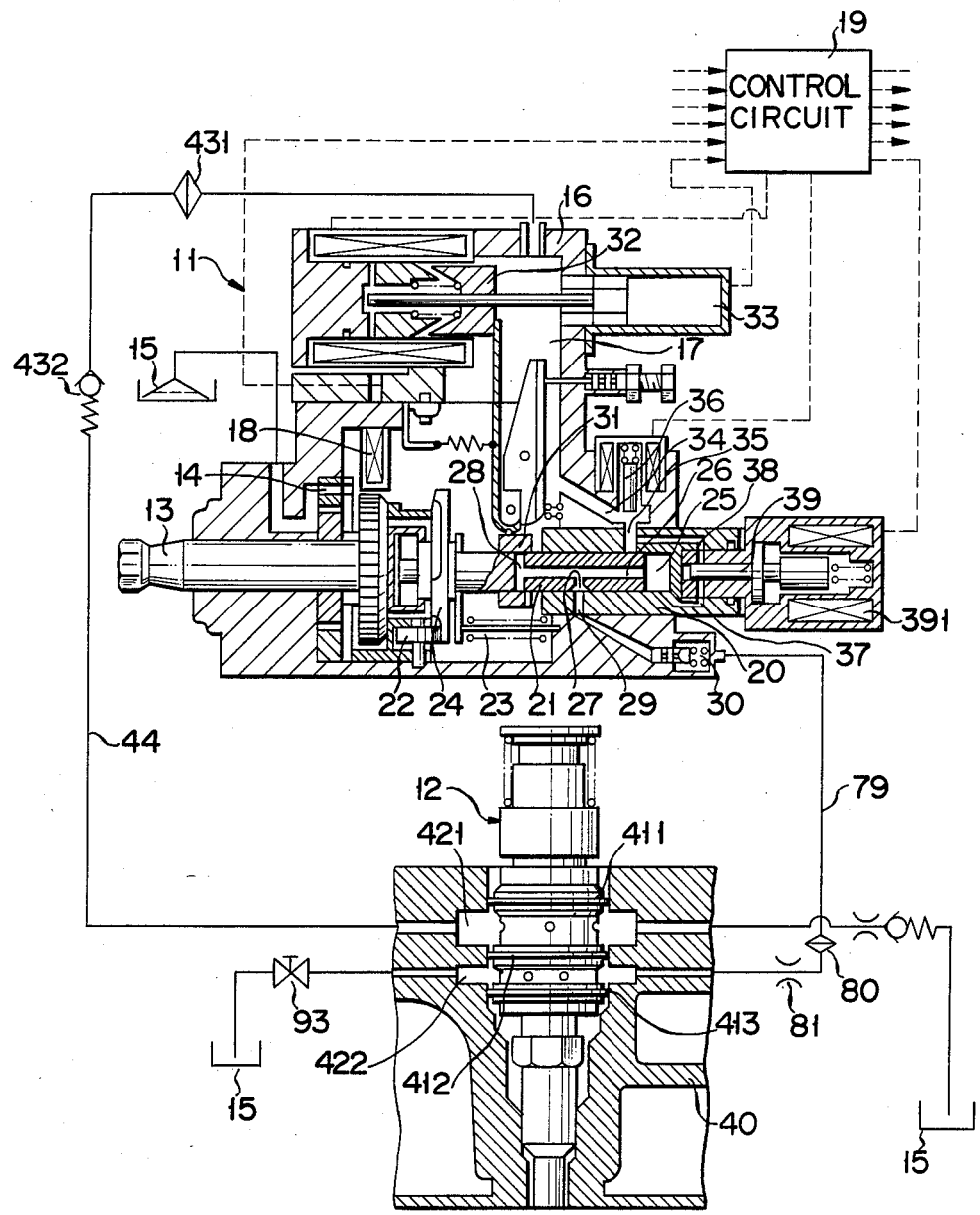
FIG. 1 shows an example of the fuel injection control apparatus according to the present invention, wherein the portion of the fuel injection control apparatus which corresponds to a cylinder in the engine is picked up.

FIG. 1 shows a fuel quantity control unit 11 of the distribution type, which the amount of fuel adjusted is supplied to a unit injector 12 for a cylinder, said fuel quantity control unit 11 and unit injector 12 forming a fuel injection control apparatus. Fuel is also distributed and supplied from the fuel quantity control unit 11 to other unit injectors, which are arranged to correspond to their cylinders, respectively. The fuel quantity control unit 11 serves to adjust the amount of fuel in accordance with the engine operation.

In the case of a 4-cylinder, 4-cycle engine, for example, the fuel quantity control unit 11 of the distribution type has a rotation shaft 13 which is rotated one time every two rotations. A feed pump 14 is integrally attached to this rotation shaft 13 and serves to forcedly supply fuel from a fuel tank 15 to a fuel chamber 17 in a housing 16 at the time of engine rotation. The fuel chamber 17 (not shown) is adjusted by a pressure adjusting system to have a predetermined fuel pressure.

Rotation information including the rotation speed of said rotation shaft 13 is detected by a detector 18 and supplied to a control circuit 19 which carries out fuel injection control.

A cylinder 20 is coaxially arranged to the rotation shaft 13 in the fuel chamber 17 and a distribution plunger 21 is inserted into the cylinder 20. This distribution plunger 21 is rotated and coaxially driven with the rotation shaft 13, while it is reciprocated in its axial direction by means of a roller 22 fixed to the housing 16 and a face cam 24 urged by a spring 23. In distributing and supplying fuel to the four cylinders, it is reciprocated four times every rotation of the rotation shaft 13. It has a fuel passage 26 extending along its axis between its foremost end and the bottom of the cylinder 20 and communicated with a distribution pump chamber 25. Said fuel passage 26 is also communicated with a distribution port 27 which is opened at the side wall of the cylinder 20, and with a spill port 28 which is opened outside and at the side of the cylinder 20. The distribution port 27 is communicated with a discharge valve 30 through a fuel passage 29 in response to the rotation angle of said distribution plunger 21, thereby supplying fuel, whose amount has been adjusted to the unit injector 12 which corresponds to the fuel passage 29, said fuel passage 29 being arranged in the cylinder 20 to correspond to each of the cylinders.

A spill ring 31 is arranged around the outer circumference of the distribution plunger 21 which corresponds to the spill port 28. The spill ring 31 is position-controlled in its axial direction by means of an electromagnetic plunger system 32 that is driven and controlled by the control circuit 19 to which signals representing accelerator position or engine operation conditions such as engine load and rotation number are supplied. In response to the movement of the distribution plunger 21 in the axial direction thereof, the spill ring 31 controls the timing at which fuel is overflowed from the spill port 28, thereby adjusting the amount of fuel to be distributed and supplied from the distribution port 27 to the injector corresponding to each of the cylinders. The operation of said electromagnetic plunger system 32 which serves to adjust and control the amount of fuel supplied is detected by a detector 33 and supplied, as detected signals, to the control circuit 19. Fuel is supplied from the fuel chamber 17 to the distribution pump chamber 25, which is formed in the cylinder 20 by means of the distribution plunger 21, through introduction and feed ports 34 and 35. An electromagnetic valve 36 is arranged corresponding to the feed port 35 and closed when the engine stops thereby preventing fuel from being fed to the distribution pump chamber 25.

The distribution pump chamber 25 and the feed port 36 are communicated with each other through drain and return passages 37 and 38, selectively communicated with each other by means of a cylinder-cutoff valve 39, which is controlled by an electromagnetic solenoid 391. Namely, the passage 37 is shut off from the passage 38 in relation to the cylinder where to fuel is usually distributed. However, both of these passages 37 and 38 are communicated with each other in relation to the cutoff cylinder, thereby enabling fuel in the distribution pump chamber 25 to flow to the fuel chamber 17 to make zero the amount of fuel adjusted.

The unit injector 12 is inserted into an engine head 40 to form two fuel galleries 421 and 422 between them by means of O-rings 411–414. Communicated with the fuel gallery 421 is the fuel chamber 17 in the fuel quantity control unit 11 to supply fuel of specified pressure to the fuel gallery 421 through a filter 431, a check valve 432 and a feed passage 44.

Figure 2:
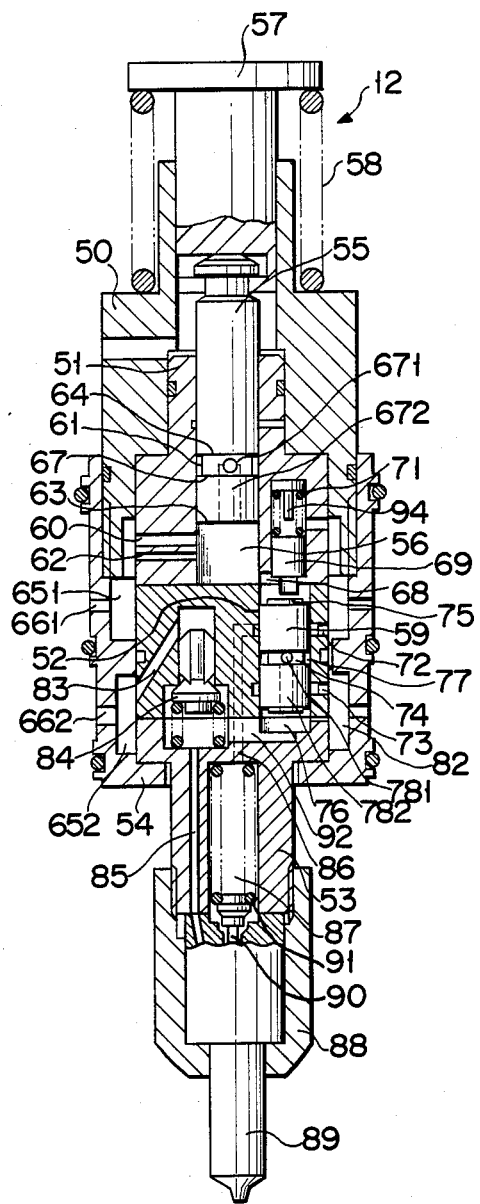
FIG. 2 is a sectional view showing an arrangement of the unit injector which is to be used in the present invention.

FIG. 2 shows the unit injector 12 in more detail, wherein a compression cylinder 51, injection cylinder 52 and nozzle holder 53 are arranged in series in an injector body 50 and integrally assembled to one another by means of a holder nut 54.

A compression plunger 55 is inserted, freely movable in its axial direction, into the compression cylinder 51, and a compression pump chamber 56 is formed at the portion of said compression plunger 55 located on the side of the injection cylinder 52. The compression plunger 55 is integrally connected to a cam follower 57, which is urged by a compression spring 58 to enlargen the compression pump chamber 56. The cam follower 57 is arranged in a way that a cam which is synchronously rotated with the engine is urged by force, which resists the spring 58 directly or through the rocker-arm push rod, to synchronously move the compression plunger 55 downward in FIG. 2 with the rotation of the engine and responsive to the fuel injection timing.

The injection cylinder 52 is communicated with the compression pump chamber 56, and an injection plunger 59 is inserted, freely movable in the axial direction, into the injection cylinder 52. The injection plunger 59 has a diameter smaller than that of the compression plunger 55.

The compression cylinder 51 is provided with feed ports 60 and 62 which are opened at the compression pump chamber 56, and the feed port 60 has a diameter larger than that of the feed port 62. These feed ports 60 and 62 are successively closed by a main lead 63 of the compression plunger 55 as the plunger 55 moves downward. In addition, they are communicated with a fuel gallery 651 formed between the compression cylinder 51 and the holder nut. The fuel gallery 651 is communicated with the fuel gallery 421 through plural openings 661.

The compression plunger 55 is provided with a ring-shaped groove 61, which is provided with a spill lead 67 and which is communicated with the compression pump chamber 56 through horizontal and vertical holes 671 and 672. The ring-shaped groove 61 is opened at the feed port 60 when the compression plunger 55 moves downward in FIG. 2, thereby communicating the compression pump chamber 56 with the fuel gallery 651.

A timing plunger 69 is arranged at the side of the compression cylinder 51 on the injection cylinder 52. The timing plunger 69 is located above the injection plunger 59 and urged downward by a plunger spring 71. A connection passage is formed between the top end face of the injection plunger 59 and the bottom end face of the timing plunger 69 and communicated with the compression pump chamber 56.

The injection cylinder 52 is provided with drain and spill ports 72 and 73, and the injection plunger 59 is provided with spill and drain leads 74 and 75 which close and open the spill and drain ports 73 and 72 as the injection plunger 59 moves. An injection pump chamber 76 is formed in that portion of the injection plunger 59 which is located on the side of the nozzle holder 53, and a ring-shaped groove 77 which is formed on the plunger 59 corresponding to the spill lead 74 is communicated with the injection pump chamber 76 through horizontal and vertical holes 781 and 782.

The adjusted amount of fuel fed through the discharge valve 30 of the fuel quantity control unit 11 is supplied to the fuel gallery 422 in the engine head 40, an opening 662 of the holder nut 54, and a gallery 652 between the holder nut 54 and the cylinder 52 through an adjuster passage 79, a filter 80 and an area reduction 81, and further to the spill port 73 through a spill passage 82 of the injection cylinder 52 or to an injection fuel passage 85 in the nozzle holder 53 through an adjuster passage and valves 83 and 84. It is also supplied from the adjuster valve 84 to the injection pump chamber 76 through an adjuster passage 92.

The drain port 72 is communicated with the fuel gallery 651, which is communicated with a nozzle spring chamber 87 in the nozzle holder 53 through a leak passage 86. The fuel gallery 422 is provided with an air escaping means 93 and is independently made.

A nozzle 89 is integrally attached to the nozzle holder 53 by means of a retaining nut 88 and the injection hole of said nozzle 89 is closed and opened by a needle valve 90. This needle valve 90 is urged by a nozzle spring 91 in the direction of closing the injection hole of the nozzle 89, and the pressure in the injection fuel passage 85 is increased and the needle valve 90 is then opened against the spring 91 to thereby carry out fuel injection.

When the compression plunger 55 is at the top dead point of the unit injector 12 which has an arrangement as described above, the injection pump chamber 76 is filled with the amount of fuel, which is to be injected, by the operation of the fuel quantity control unit 11 of the distribution type, and the injection plunger 59 is set at a position which corresponds to the amount of fuel filled. The timing plunger 69 is lifted together with the injection plunger 59 by the adjusting pressure which pushes the injection plunger 59 against the spring 71, and it is thus set at a position which corresponds to the amount of fuel filled. Fuel in the fuel chamber 17 of the quantity control unit 11 is adjusted in quantity and fed to the compression pump chamber 56 through the fuel galleries 421, 651 and feed ports 60, 62.

When the cam follower 57 is driven against the spring 58 by means of the cam, which is rotated in response to the rotation of the engine to drive the compression plunger 55, fuel in the compression pump chamber 56 is discharged through the feed port 60. The main lead 63 closes the feed port 60 as the plunger 55 moves. Since fuel is discharged only through the feed port 62 of a smaller diameter, pressure in the compression pump chamber 56 increases. The increased pressure of the fuel passes through the connection passage 68 to drive the timing and injection plungers 69 and 59. Since the pressure which is necessary to drive the needle valve 90 of the nozzle 89 is high, the timing plunger 69 is driven at first. The pressurized fuel continues to push the timing plunger 69 against the spring 71 until the plunger 69 strikes a stopper 94, keeping the pressure from increasing in the compression pump chamber 56.

When the timing plunger 69 is moved to strike the stopper 94, the pressure in the compression pump chamber 56 slowly rises to drive the injection plunger 59. When the injection plunger 59 is moved and fuel pressure in the injection pump chamber 76 rises higher than the pressure necessary to open the nozzle 89, fuel is being injected from the nozzle 89 through the adjuster and fuel passages 92 and 85. Namely, the injection is changed only by a value represented by the following equation:

(moving distance of timing plunger 69)
×(sectional area of timing plunger 69)
/ (sectional area of compression plunger 55)
=(moving distance of compression plunger 55)

When the diameter and moving distance of the timing plunger 69 are changed, the injection timing which is responsive to the amount of fuel injected can be set at a value suitable for the engine. As the amount of fuel injected enlarges, the timing plunger 69 is lifted by the injection plunger 59, thereby making its moving stroke shorter and the injection timing faster. Namely, the lead angle is progressed under high load condition.

The compression plunger 55 is driven and lowered, and the main lead 63 is closed by the feed port 62 of a smaller diameter under the state of lowering the compression plunger 55. When the main lead 63 is closed, the pressure in the compression pump chamber 56 quickly rises to drive the injection plunger 59 at a high speed, causing fuel to be injected through the nozzle 89 at a high injection rate. The pattern of this injection rate is of delta one. The compression plunger 55 still continues to be driven against the spring 58, thereby keeping fuel from being injected.

When the injection plunger 59 is driven as described above and the spill lead 74 opens the spill port 73, increased fuel in the injection pump chamber 76 is returned to the fuel gallery 652 and the adjuster passage 83 through the ring-shaped groove 77, the spill port 73 and the spill passage 83, and the fuel pressure in the injection pump chamber 76 is decreased, thereby finishing the fuel injection operation. Namely, the injection plunger 59 is lifted corresponding to the amount of fuel fed from the fuel quantity control unit 11, so that the fuel injection operation of injecting an amount of fuel which corresponds to the stroke of the injection plunger 59 lifted or the amount of fuel adjusted can be achieved.

Thereafter, the compression plunger 55 is further driven to drive the injection plunger 59 and the drain lead 75 opens the drain port 72 to introduce fuel in the compression pump chamber 56 into the fuel gallery 651 through the drain port 72 and drain it into an external fuel tank through the fuel gallery 421. The move of the injection plunger 59 is temporarily stopped at this point and the timing plunger 69 is pushed down by the spring 71 to contact the injection plunger 59, thereby preventing the injection plunger 59 from being vibrated.

The compression plunger 55 still continues to be lowered, causing the spill lead 67 to open the feed port 60 in the compression cylinder 51 and fuel in the compression pump chamber 56 to be discharged through the feed port 60. The compression plunger 55 is still further lowered and stopped at the bottom dead center.

Overflowed fuel which has been once returned to the fuel gallery 652 is fed back to the injection pump chamber 76 from the spill passage 82 and the spill port 73 or from the adjuster passage 83 and the adjuster valve 84 repeatedly used, thereby enhancing the efficiency of adjusting the amount of fuel.

When the compression plunger 55 reaches the bottom dead center as described above and begins to rise again, the feed port 60 is closed by the spill lead 67. Pressure in the compression pump chamber 56 is thus lowered and subjected to a force which serves to pull up the injection plunger 59, so that fuel pressurized in the distribution pump chamber 25 of the adjuster means 11 is supplied to the injection pump chamber 76 through the adjuster passage 79, the gallery 422, the opening 662 and the gallery 652 to thereby drive the injection plunger 59 upward. The fuel which is supplied to the injection pump chamber 76 is adjusted in quantity in the fuel quantity control unit 11 so as to correspond to the engine operation. When the engine is under a high load, a large amount of fuel is supplied to the pump chamber 76, whereas it is under a low load, the amount of fuel is decreased. The timing plunger 69 is also moved together with the injection plunger to a position which corresponds to the amount of fuel injected.

The amount of fuel which supplies the discharge valve 30 to the adjuster passage 79 becomes equal to a value which is obtained by multiplying the compression stroke of the distribution plunger 21 by the sectional area of this plunger 21, said compression stroke of the distribution plunger 21 lasting from the time when the suction lead at the end face of said distribution plunger closes the feed port 35 to the time when the end face of the spill ring 31 opens the spill port 28. This amount of fuel changes depending upon the position of the spill ring 31 or such conditions as an accelerator position and the number of engine rotation, and it is controlled to an optimum value in accordance with the conditions of engine operation.

In a case where one of the cylinders should be cut off, an electromagnetic solenoid 391 is made operative in the process of adjusting the amount of fuel relative to the cutoff cylinder, thereby causing the cutoff valve 39 to be opened. Fuel in the distribution pump chamber 25 is fed back to the feed port 35 through the drain and return passages 37 and 38, thereby preventing fuel in the distribution pump chamber 25 from being fed into the injection pump chamber 76. Fuel amount adjusting is not carried out relative to the cutoff cylinder accordingly.

When fuel is fed into the injection pump chamber 76 and the compression plunger 55 is further lifted to open the feed ports 62 and 60, fuel is supplied from the fuel gallery 651 to the compression pump chamber 56 and the compression plunger 55 moves to its top dead point and stops thereof. The above operation will then be repeated in accordance with the rotation of the engine.

It will be described how the spill ring 31, injection timing and electromagnetic solenoid 391 are controlled in the fuel quantity control unit 11 of the distribution type.

Figure 3:
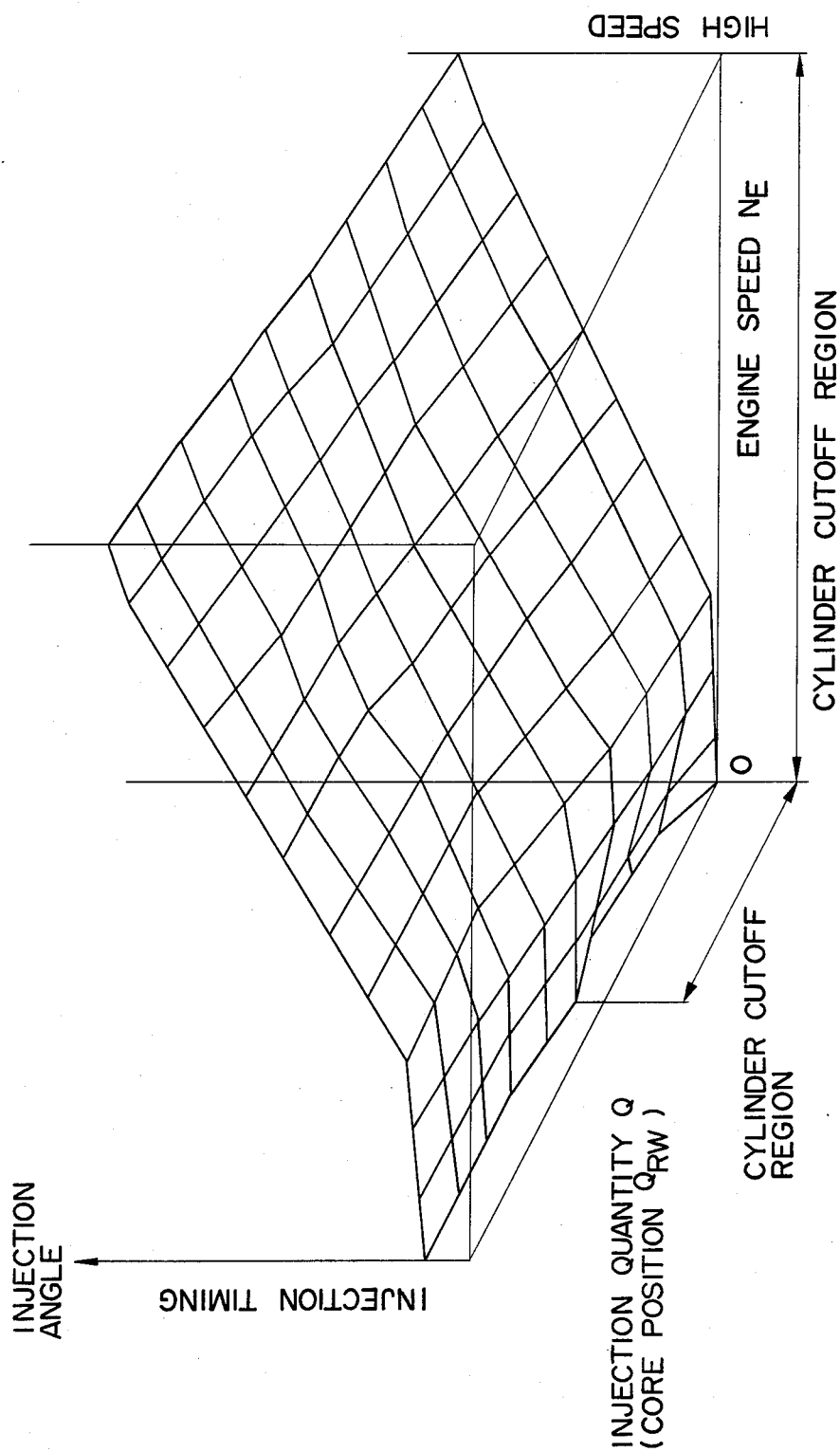
FIG. 3 is a view intended to explain the relation between an engine operation and fuel injection timing.

As shown in FIG. 3, the injection timing is nonambiguously determined corresponding to the amount of fuel injected, while it is made certain in relation to the number of engine rotation. On account of the preflow effect of the dynamic compression plunger 55, it has been observed that the lead angle has progressed in order to gradually increase the injection timing.

Figure 4:
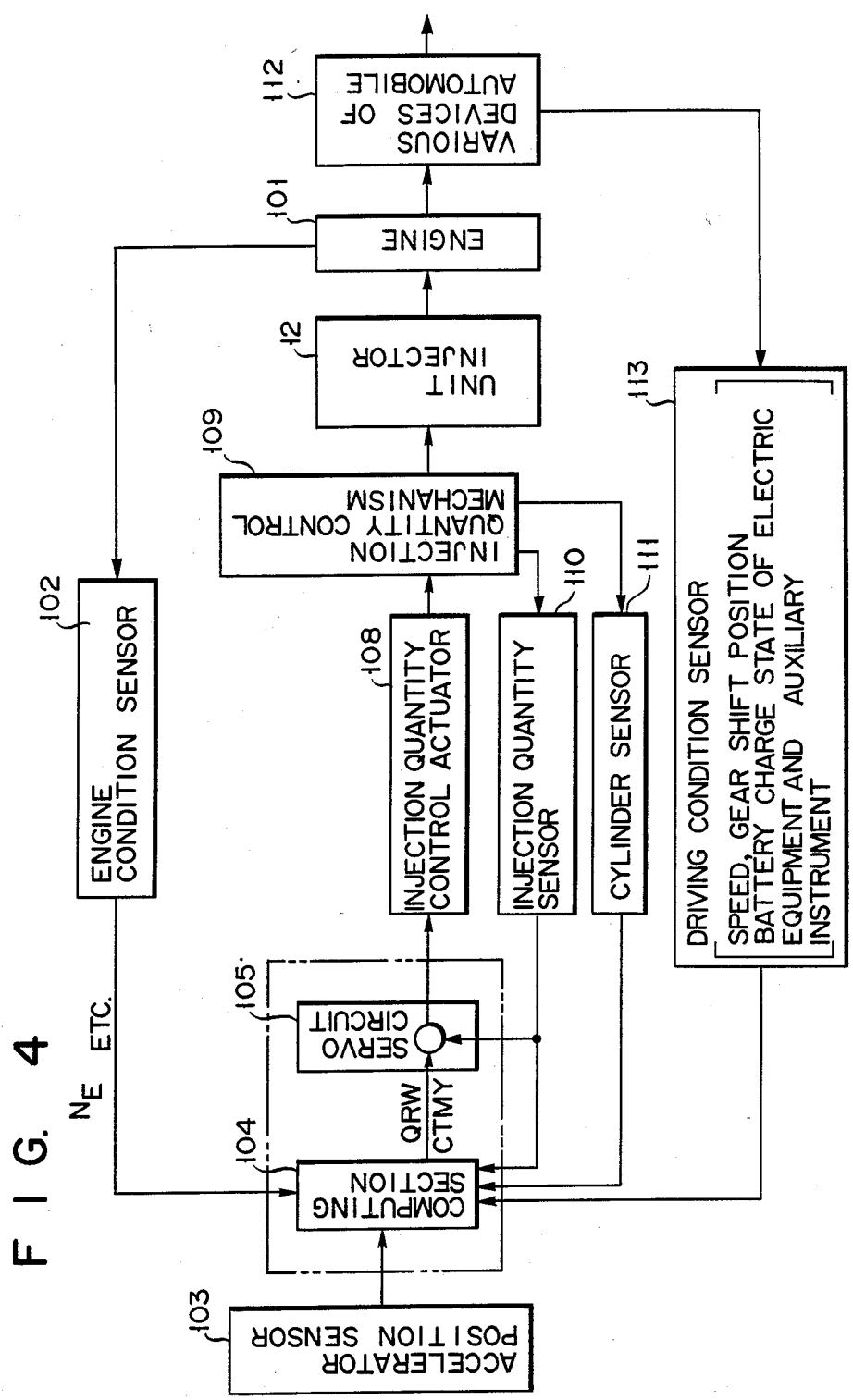
FIG. 4 is a block diagram intended to explain the operation of adjusting and controlling the amount of fuel injected.

Core position QRW of the electromagnetic plunger system 32 which serves to control the amount of fuel injected is controlled as shown in FIG. 4. A command of the core position QRW controls an actuator 108 through a servo circuit 105 and drives a fuel amount adjuster system 109 such as the spill ring, said actuator serving to control the amount of fuel injected. The amount of injected fuel which corresponds to the operation of the fuel amount adjuster system is detected by a detector 110 and fed back to the servo circuit 105 and further to an operational section 104. At the same time, the number of cylinders is detected from the fuel amount adjuster system 109 by means of a detector 111 and supplied to the operational section 104 as information which represents the conditions of engine operation. Further, running conditions such as running (or driving) speed, gear shift position, battery charge and states of electric equipments and auxiliary instruments are detected from an automobile 112, whose driving is controlled by an engine 101, by means of a detector 113 and supplied to the operational section 104.

Figure 5:
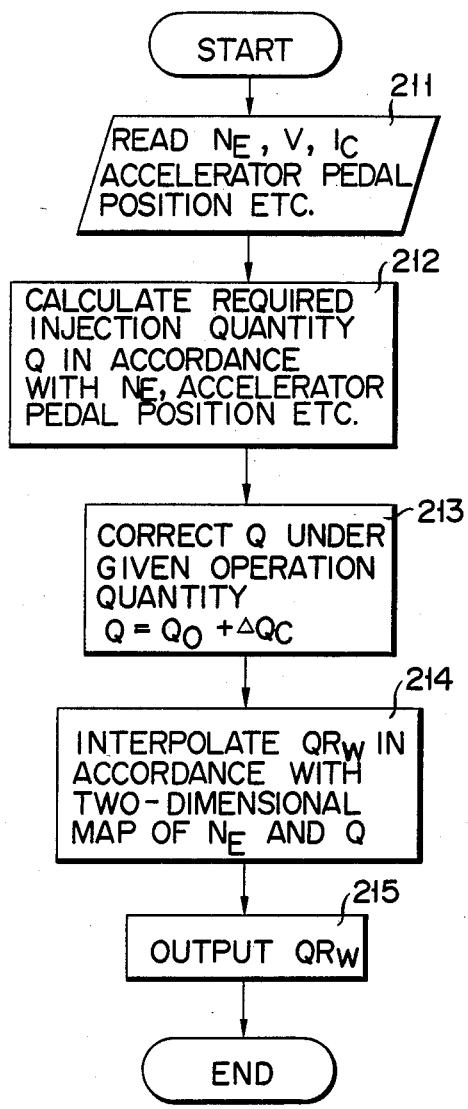
FIG. 5 is a flow chart showing the operation of adjusting and directing the amount of fuel injected.

FIG. 5 shows how the desired value QRW of core of the electromagnetic plunger 32 is operated. The condition of engine operation (or number of engine rotation $N_E$) and driving condition (or speed V and the like) are read out at a step 211 at first and a required amount of fuel Qo injected is operated at a step 212. In step 213 where cylinder-cutoff operation is intended in response to the driving condition, the amount of fuel injected is corrected on the basis of a previously stored correction value $\Delta Qc$ as follows:

$$Q = Q_o + \Delta Q_c$$

The core position QRW is interpolation-operated at a step 214, using the two-dimensional map of a previously stored and set "$N_E$-Q", and outputted through a step 215. Exciting current which corresponds to this output is flowed to the electromagnetic plunger system 32 to drive the core thereof and control the position of the spill ring 31, thereby achieving the adjustment of the amount of fuel injected. Control is repeated until the engine reaches a desired rotation number and torque in a way that the number of engine rotation, accelerator position and core position are read out under the above condition by the detectors and then feedback-controlled.

Figure 6:
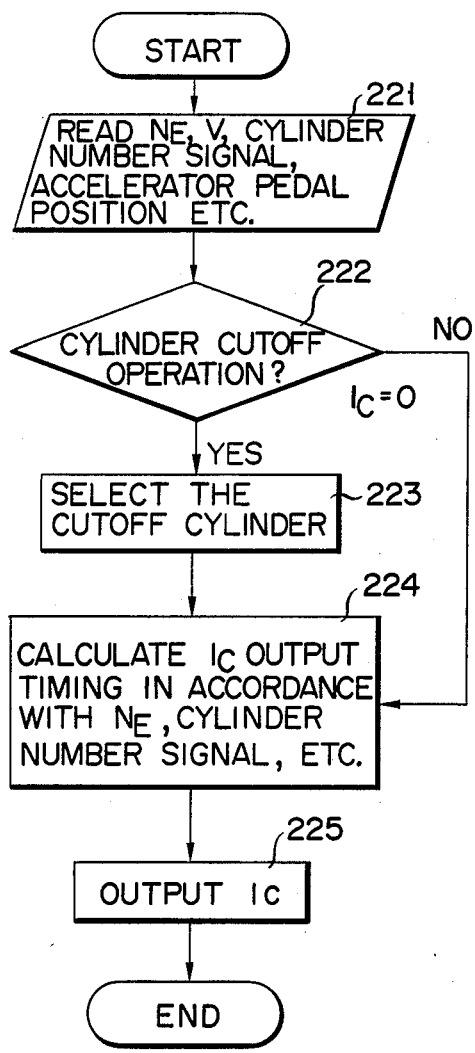
FIG. 6 is a flow chart showing the flow of control whereby the engine is operated under cut-off cylinders.

FIG. 6 shows how the electromagnetic solenoid 391 controls the cylinder-cutoff valve 39. The condition of engine operation and driving condition are read out and cylinder number signal is further read out at a step 221, and it is judged at a step 222 whether or not cylinder-cutoff operation can be made. It is judged which cylinder should be cut off, at a step 223 on the basis of the preset conditions of the engine. Current Ic is flowed to the electromagnetic solenoid 391 at a step 224 in that fuel in the distribution pump chamber 25 should be returned to the feed port 38 at the timing of adjusting the amount of fuel in relation to the cutoff cylinder, and the cylinder-cutoff valve 39 is opened at a step 225, the timing of flowing current Ic to the electromagnetic solenoid 391 being calculated at the step 224 from the number of engine rotation $N_E$ and cylinder number signal. When the step 222 is not judged, the process advances to the step 224 and control is not carried out to open the cylinder-cutoff valve 39.

Figure 7:
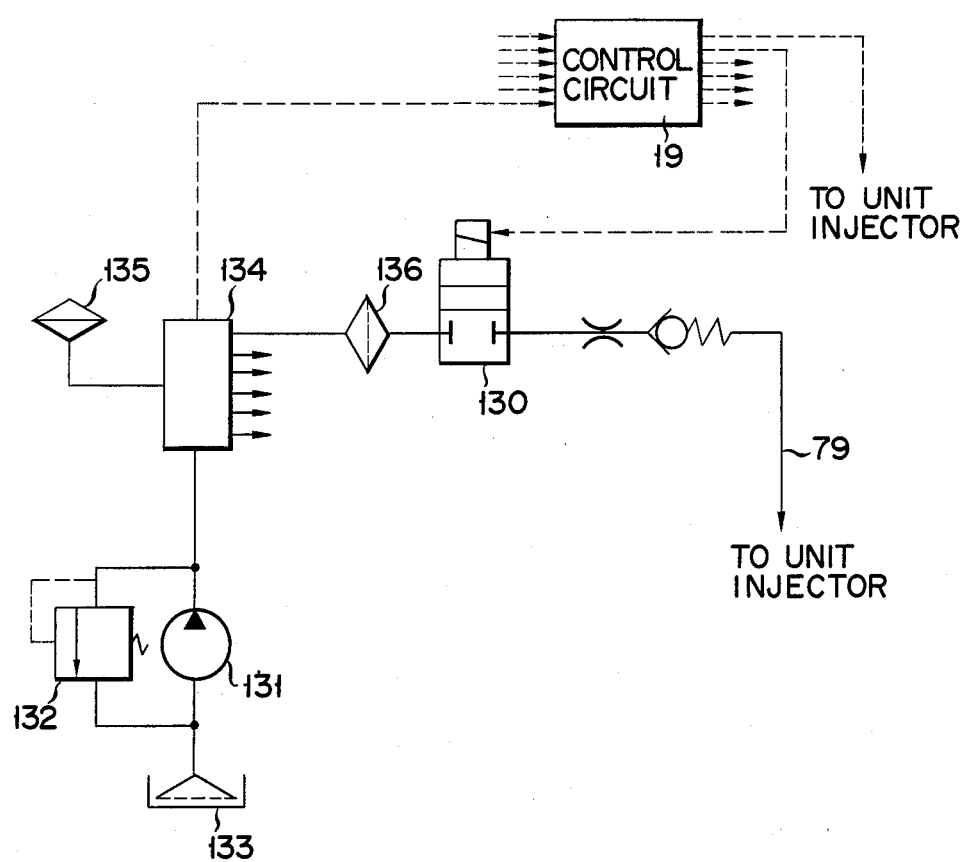
FIG. 7 shows another means for adjusting the amount of fuel injected.

FIG. 7 shows another example of the fuel quantity control system wherein an electromagnetic valve 130 for adjusting the amount of fuel is used. A feed pump 131 and a pressure adjuster valve 132 pick up fuel of a certain pressure from a fuel tank 133, and a surge tank 134 and an accumulator 135 absorb the pressure pulsation of fuel. Fuel thus stabilized in pressure is supplied to the electromagnetic adjuster valve 130 through a filter 136. This electromagnetic valve 130 adjusts the amount fuel injected depending upon the time length of remaining opened and feeds it to the unit injector. The time length during the opened electromagnetic valve 130 is controlled by the control circuit 19. The injector has the same arrangement as that of the one shown in FIG. 2.

FIG. 8 shows a second example of the unit injector, which is different from the one shown in FIG. 2 in that the timing plunger 69 is located under the injection plunger 59, that the spring 71 is arranged between the plungers 59 and 69, and that a spring 95 is located under the timing plunger 69.

In the unit injector 12, the injection plunger 59 is lifted to its top dead point by means of the two springs 71 and 95 at the time of adjusting the amount of fuel, while the timing plunger 69 is stopped at a position where balance is established between downward force caused by the quantity-adjusted fuel and spring 71 and upward force caused by the spring 95. More specifically, control is carried out as the amount of fuel injected enlarges, the timing plunger 69 is further pushed down to shorten its moving distance to the nozzle holder 53 and to increase the injection timing.

FIG. 9 shows a third example of the unit injector, which is different from the one shown in FIG. 2 in that the stopper 94 for the timing plunger 69 is made shorter and that the communication passage 96 to the fuel gallery 651 is located lower than the one shown in FIG. 2. The position at which the timing plunger 69 is driven and stopped by the pressure in the compression pump chamber 56 accords with the time when the passage 96 is closed by the timing plunger 69. Therefore, the plunger 69 does not strike the stopper 94.

What is claimed is:

1. A fuel injection control apparatus for use in an engine comprising:
   a compression plunger driven in response to fuel injection timing which corresponds to the rotation of an engine;
   a compression pump chamber which is filled with fuel and whose volume is compressed when said compression plunger is driven;
   an injection plunger driven by fuel which is pushed out of said compression pump chamber by the operation of said compression plunger;
   an injection pump chamber defined by said injection plunger;
   means for filling said injection pump chamber with fuel whose amount has been determined in accordance with the conditions of the operation of said engine;
   a timing plunger slidable between a stop position and a full position, the amount of fuel said filling means provides to said injection pump chamber cooperating with said injection plunger to mechanically set said timing plunger at said full position corresponding to the amount of fuel to be injected, said timing plunger contacting the face of said injection plunger on which the fuel pressure in the compression pump chamber acts at said full position when said compression plunger is not driven, said fuel in said compression pump chamber moving said timing plunger as fuel is pushed out of said compression pump chamber, and the fuel pressure in said compression pump chamber acting on said injection plunger when said timing plunger is moved to said stop position; and
   fuel injection means, responsive to the operation of said compression plunger, for moving said timing plunger from said full position to said stop position, then raising the pressure of said compression pump chamber to thereby drive said injection plunger and in this high pressure state, deliver the fuel in said injection pump chamber and inject it into an engine cylinder.

2. An apparatus according to claim 1, wherien a face of said timing plunger opposite said injection plunger is provided with a stopper means for defining said stop position.

3. An apparatus according to claim 1, further comprising means defining a chamber which is filled with fuel adjacent a face of said timing plunger opposite said injection plunger and a fuel discharge passage which is closed by said timing plunger when said timing plunger is driven by the fuel pressure in said compression pump chamber, and wherein said stop position is reached when said fuel discharge passage is closed by said timing plunger.

4. An apparatus according to claim 1, further comprising a spring biasing said timing plunger into contact with a face of said injection plunger on which the fuel pressure in said compression pump chamber acts when said compression plunger is not being driven and said fuel injection means includes means for allowing fuel to flow from said compression pump chamber to an area between said injection and timing plungers.

5. An apparatus according to claim 1, further comprising a fuel injection valve which is opened when the pressure in said injection pump chamber is raised higher than said high pressure state.

6. An apparatus according to claim 1, further comprising a spring biasing said timing plunger into contact with a face of said injection plunger on which the fuel pressure in said compression pump chamber acts when said compression plunger is not being driven, and said fuel injection means includes means for allowing full to flow from said compression pump chamber to an area between said timing and injection plungers and a valve which is opened to carry out fuel injection operation when the pressure in said compression pump chamber is raised higher than said high pressure state, the pressure which causes said valve to be opened being sufficiently higher than the urging force of said spring which acts on said timing plunger.

7. An apparatus according to claim 1, wherein said compression pump chamber is provided with a first feed port which is closed at first by said compression plunger, and with a second feed port which is closed after said first feed port is closed, said first feed port having a diameter larger than that of said second feed port, the pressure in said compression plunger not being raised until said compression plunger closes said first feed port, the fuel pressure in said compression pump chamber being gently raised following the movement of said compression plunger after said first feed port is closed by said compression plunger.

8. An apparatus according to claim 7, wherein said fuel injection means includes means for causing the fuel pressure in said compression pump chamber to act on said timing plunger to drive said timing plunger to said stop position by the fuel pressure in said compression pump chamber which is raised when said compression plunger closes said first feed port, thereby setting a timing at which the pressure in said compression pump chamber acts on said injection plunger.

9. An apparatus according to claim 1, wherein said fuel injection means includes means for causing said timing plunger to be driven by the fuel pressure in said injection pump chamber and a spring biasing said timing plunger against the fuel pressure in said injection pump chamber, said timing plunger being moved to said stop position against said spring force when said injection plunger is driven by the fuel pressure in said compression pump chamber and the fuel pressure in said injection pump chamber is raised, the fuel pressure in said injection pump chamber then acting to carry out the fuel injection operation.

* * * * *